(12) United States Patent
Yoneyama et al.

(10) Patent No.: US 11,280,507 B2
(45) Date of Patent: Mar. 22, 2022

(54) AIR-CONDITIONER

(71) Applicant: HITACHI-JOHNSON CONTROLS AIR CONDITIONING, INC., Tokyo (JP)

(72) Inventors: Hiroyasu Yoneyama, Tokyo (JP); Shunji Sasaki, Tokyo (JP); Yoshiyuki Yamanashi, Tokyo (JP); Atsuhiko Yokozeki, Tokyo (JP)

(73) Assignee: HITACHI-JOHNSON CONTROLS AIR CONDITIONING, INC., Tokyo (JP)

(*) Notice: Subject to any disclaimer, the term of this patent is extended or adjusted under 35 U.S.C. 154(b) by 261 days.

(21) Appl. No.: 16/479,965

(22) PCT Filed: Nov. 16, 2017

(86) PCT No.: PCT/JP2017/041188
§ 371 (c)(1),
(2) Date: Jul. 23, 2019

(87) PCT Pub. No.: WO2019/097620
PCT Pub. Date: May 23, 2019

(65) Prior Publication Data
US 2019/0338971 A1    Nov. 7, 2019

(51) Int. Cl.
*F24F 11/36* (2018.01)
*F24F 11/77* (2018.01)

(52) U.S. Cl.
CPC .............. *F24F 11/36* (2018.01); *F24F 11/77* (2018.01); *F25B 2400/12* (2013.01);
(Continued)

(58) Field of Classification Search
CPC ........ F24F 11/36; F24F 11/74; F25B 2400/12; F25B 2500/222
See application file for complete search history.

(56) References Cited

U.S. PATENT DOCUMENTS 5,230,223 A * 7/1993 Hullar .................. F25B 49/027
62/196.4
5,608,384 A * 3/1997 Tikijian ............... G01N 27/626
324/464
(Continued)

FOREIGN PATENT DOCUMENTS

CN       201652623 U     11/2010
CN       105705888 A      6/2016
(Continued)

OTHER PUBLICATIONS

International Search Report of PCT/JP2017/041188 dated Jan. 30, 2018.
Chinese Office Action received in corresponding Chinese Application No. 201780069153.3 dated Jun. 18, 2020.
(Continued)

*Primary Examiner* — Larry L Furdge
*Assistant Examiner* — Alexis K Cox
(74) *Attorney, Agent, or Firm* — Mattingly & Malur, PC (57) ABSTRACT

An air-conditioner which performs an appropriate control in the event of a leak of refrigerant. The air-conditioner includes a refrigerant circuit, a refrigerant leak sensor which senses a leak of refrigerant in the refrigerant circuit, an indoor fan which delivers air to the indoor heat exchanger, and an indoor control circuit which, upon sensing a leak of refrigerant by the refrigerant leak sensor, controls the indoor fan based on whether the refrigerant sealed in the refrigerant circuit is flammable.

8 Claims, 6 Drawing Sheets

(52) U.S. Cl.
CPC ..... *F25B 2500/22* (2013.01); *F25B 2500/222* (2013.01); *F25B 2600/05* (2013.01)

(56) References Cited

U.S. PATENT DOCUMENTS

| | | | | |
|---|---|---|---|---|
| 6,510,698 | B2* | 1/2003 | Kasai | F25B 47/00 |
| | | | | 62/77 |
| 10,767,882 | B2* | 9/2020 | Kowald | F24F 11/36 |
| 2002/0178738 | A1* | 12/2002 | Taira | F24F 11/30 |
| | | | | 62/129 |
| 2009/0301123 | A1* | 12/2009 | Monk | H05K 7/1497 |
| | | | | 62/259.2 |
| 2010/0300129 | A1* | 12/2010 | Bean, Jr. | F25B 49/005 |
| | | | | 62/129 |
| 2013/0152613 | A1* | 6/2013 | Yamashita | F25B 49/02 |
| | | | | 62/129 |
| 2014/0223931 | A1* | 8/2014 | Shapiro | F25B 49/005 |
| | | | | 62/89 |
| 2016/0245566 | A1 | 8/2016 | Hiraki et al. | |
| 2019/0017718 | A1* | 1/2019 | Suzuki | F25B 13/00 |
| 2019/0086111 | A1* | 3/2019 | Yamamoto | F24F 11/88 |
| 2019/0195542 | A1* | 6/2019 | Hansen | F24F 7/013 |
| 2020/0158391 | A1* | 5/2020 | Inamdar | F25B 41/31 |

FOREIGN PATENT DOCUMENTS

| | | |
|---|---|---|
| EP | 3147595 A1 | 3/2017 |
| JP | 2016-197006 A | 11/2016 |
| JP | 2017-141998 A | 8/2017 |
| JP | 2017-207256 A | 11/2017 |

\* cited by examiner

AIR-CONDITIONER

TECHNICAL FIELD

The present invention relates to an air-conditioner.

BACKGROUND ART

As a countermeasure for a leak of refrigerant from a refrigerant circuit of an air-conditioner, a technique described in Patent Literature 1 is known, for example. Specifically, Patent Literature 1 describes that, in case of a refrigerant leak, a controller causes an indoor fan to be driven.

CITATION LIST

Patent Literature

Patent Literature 1: JP-A-2016-197006

DISCLOSURE OF THE INVENTION

Problems to be Solved by the Invention

According to the technique described in Patent Literature 1, in the event that the refrigerant has leaked from a refrigerant circuit, the indoor fan is driven in any case in order to disperse the refrigerant regardless of whether the refrigerant is flammable. However, depending on the type of refrigerant (whether it is flammable), it may not be necessary to drive the indoor fan even in case of a refrigerant leak. It is desirable to further enhance the comfort of a user by not unnecessarily driving the indoor fan during stoppage of an air-conditioning operation.

Accordingly, an object of the present invention is to provide an air-conditioner which performs an appropriate control in the event of a leak of refrigerant.

Solutions to the Problems

In order to solve the problem, an air-conditioner according to the present invention is provided with a controller which, upon sensing by a refrigerant leak sensor of a leak of refrigerant, controls an indoor fan based on whether a refrigerant sealed in a refrigerant circuit is flammable.

Effects of the Invention

According to the present invention, it is possible to provide an air-conditioner which performs an appropriate control in the event of a leak of refrigerant.

DESCRIPTION OF THE EMBODIMENTS

First Embodiment

<Configuration of Air-Conditioner>

Figure 1:
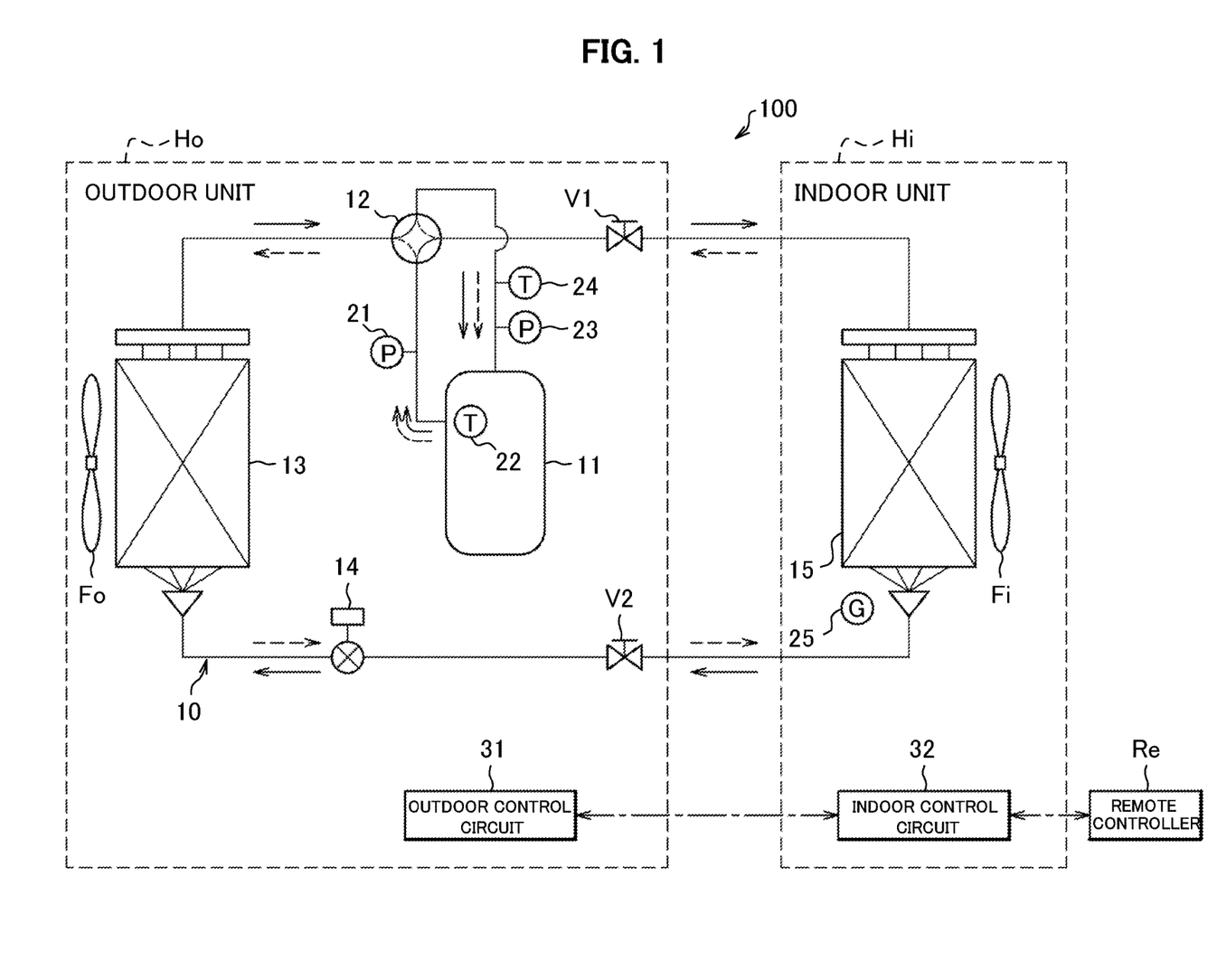
FIG. 1 is a configuration diagram of an air-conditioner according to a first embodiment of the present invention.

FIG. 1 is a configuration diagram of an air-conditioner 100 according to a first embodiment.

In FIG. 1, the direction of flow of refrigerant during heating operation is indicated by solid lines. The direction of flow of refrigerant during cooling operation is indicated by dashed lines.

The air-conditioner 100 is an apparatus that performs air-conditioning, such as cooling and heating. The air-conditioner 100 may be of a floor-installed type, a ceiling-embedded type, or a wall-hanging type.

As depicted in FIG. 1, the air-conditioner 100 is provided with a refrigerant circuit 10, an outdoor fan Fo, an indoor fan Fi, and shut-off valves V1, V2. The air-conditioner 100 is also provided with, in addition to the above configuration, sensors 21 to 25, an outdoor control circuit 31 (controller), an indoor control circuit 32 (controller), and a remote controller Re.

The refrigerant circuit 10 is a circuit through which refrigerant is circulated in a refrigeration cycle (heat pump cycle). As depicted in FIG. 1, the refrigerant circuit 10 is provided with a compressor 11, a four-way valve 12, an outdoor heat exchanger 13, an expansion valve 14, and an indoor heat exchanger 15.

The compressor 11 is an apparatus that compresses gaseous refrigerant. The type of the compressor 11 is not particularly limited, and various types of compressor, such as a scroll type, a piston type, a rotary type, a screw type, or a centrifugal type may be used. While omitted in FIG. 1, an accumulator (gas-liquid separator) is disposed on the suction side of the compressor 11.

The outdoor heat exchanger 13 is a heat exchanger for exchanging heat between the refrigerant flowing through a heat transfer pipe therein (not depicted) and external air delivered from the outdoor fan Fo.

The outdoor fan Fo is a fan that delivers external air to the outdoor heat exchanger 13, and is installed in the vicinity of the outdoor heat exchanger 13.

The indoor heat exchanger 15 is a heat exchanger that exchanges heat between the refrigerant flowing through a heat transfer pipe therein (not depicted) and the indoor air (air in a space to be air-conditioned) delivered from the indoor fan Fi.

The indoor fan Fi is a fan that delivers the indoor air to the indoor heat exchanger 15, and is installed in the vicinity of the indoor heat exchanger 15.

The expansion valve 14 has the function of decompressing the refrigerant that has been condensed by a "condenser" (one of the outdoor heat exchanger 13 and the indoor heat exchanger 15). The refrigerant that has been decompressed by the expansion valve 14 is guided to an "evaporator" (the other of the outdoor heat exchanger 13 and the indoor heat exchanger 15).

The four-way valve 12 is a valve that switches the flow passageway of refrigerant in accordance with the operation mode of the air-conditioner 100. For example, during cooling operation (see the dashed line arrows in FIG. 1), the refrigerant is circulated in a refrigeration cycle in the refrigerant circuit 10 in which the compressor 11, the outdoor heat exchanger 13 (condenser), the expansion valve 14, and the indoor heat exchanger 15 (evaporator) are connected annularly successively via the four-way valve 12.

During heating operation (see the solid line arrows in FIG. 1), the refrigerant is circulated in a refrigeration cycle in the refrigerant circuit 10 in which the compressor 11, the indoor heat exchanger 15 (condenser), the expansion valve 14, and the outdoor heat exchanger 13 (evaporator) are annularly successively connected via the four-way valve 12. Thus, in the refrigerant circuit 10, the refrigerant is circulated in a refrigeration cycle through the compressor 11, the "condenser", the expansion valve 14, and the "evaporator" successively.

In the example depicted in FIG. 1, the compressor 11, the four-way valve 12, the outdoor heat exchanger 13, the expansion valve 14, the outdoor fan Fo and the like are disposed in the outdoor unit Ho. Meanwhile, the indoor heat exchanger 15, the indoor fan Fi and the like are disposed in the indoor unit Hi.

The shut-off valves V1, V2 are valves that are opened after the air-conditioner 100 has been installed, to allow the refrigerant that has been sealed in the outdoor unit Ho to be delivered throughout the refrigerant circuit 10.

The discharge pressure sensor 21 is a sensor that detects the pressure (discharge pressure) of the refrigerant discharged from the compressor 11, and is installed in the vicinity of a discharge opening of the compressor 11.

The discharge temperature sensor 22 is a sensor that detects the temperature (discharge temperature) of the refrigerant discharged from the compressor 11, and is installed in the vicinity of the discharge opening of the compressor 11.

The suction pressure sensor 23 is a sensor that detects the pressure (suction pressure) of the refrigerant suctioned into the compressor 11, and is installed in the vicinity of a suction opening of the compressor 11.

The suction temperature sensor 24 is a sensor that detects the temperature (suction temperature) of the refrigerant suctioned into the compressor 11, and is installed in the vicinity of the suction opening of the compressor 11.

The values detected by the discharge pressure sensor 21, the discharge temperature sensor 22, the suction pressure sensor 23, and the suction temperature sensor 24 are output to the outdoor control circuit 31.

The refrigerant leak sensor 25 is a sensor that senses a leak of refrigerant in the refrigerant circuit 10, and is installed at a predetermined location where it is easy to sense a leak of refrigerant. The refrigerant leak sensor 25 may be of various types, such as a semiconductor type, an infrared type, a catalytic combustion type, or an electrochemical type.

When the indoor unit Hi is of floor-installed type, the refrigerant leak sensor 25 is often installed on a bottom plate (not depicted) of the indoor unit Hi. For example, if the refrigerant has leaked from a connection portion of the heat transfer pipe (not depicted) of the indoor heat exchanger 15, gaseous refrigerant settles and collects at the bottom because the refrigerant has a greater specific gravity than air. If the concentration of the refrigerant that the refrigerant leak sensor 25 has detected is more than or equal to a predetermined threshold value, the refrigerant leak sensor 25 senses a refrigerant leak and outputs a refrigerant leak sense signal to the indoor control circuit 32.

The outdoor control circuit 31 is a microcomputer, for example, and includes, while not depicted, electronic circuits of, e.g., a central processing unit (CPU: not depicted), a read only memory (ROM), a random access memory (RAM), and various interfaces. A program stored in the ROM is read and loaded to the RAM, and the CPU performs various processes. The outdoor control circuit 31, based on the values detected by the sensor 21 to 24, for example, controls the compressor 11, the expansion valve 14, the outdoor fan Fo and the like.

The indoor control circuit 32 is a microcomputer, for example, and is connected to the outdoor control circuit 31 via a communication line (the dashed and single-dotted line arrow). The indoor control circuit 32 controls the indoor fan Fi and the like based on information received from the outdoor control circuit 31 and signals from the remote controller Re.

The remote controller Re is operated by a user and transmits a predetermined infrared signal to the indoor unit Hi. For example, command signals relating to operation/stoppage, a change in setting temperature, timer setting, an operation mode change request and the like are transmitted from the remote controller Re to the indoor unit Hi. Upon sensing by the refrigerant leak sensor 25 of a refrigerant leak, the relevant information is transmitted from the indoor unit Hi to the remote controller Re, and further displayed on the remote controller Re.

The remote controller Re may include a central remote controller used in variable refrigerant flow (VRF) systems, packaged air conditioning (PAC) systems and the like.

Figure 2:
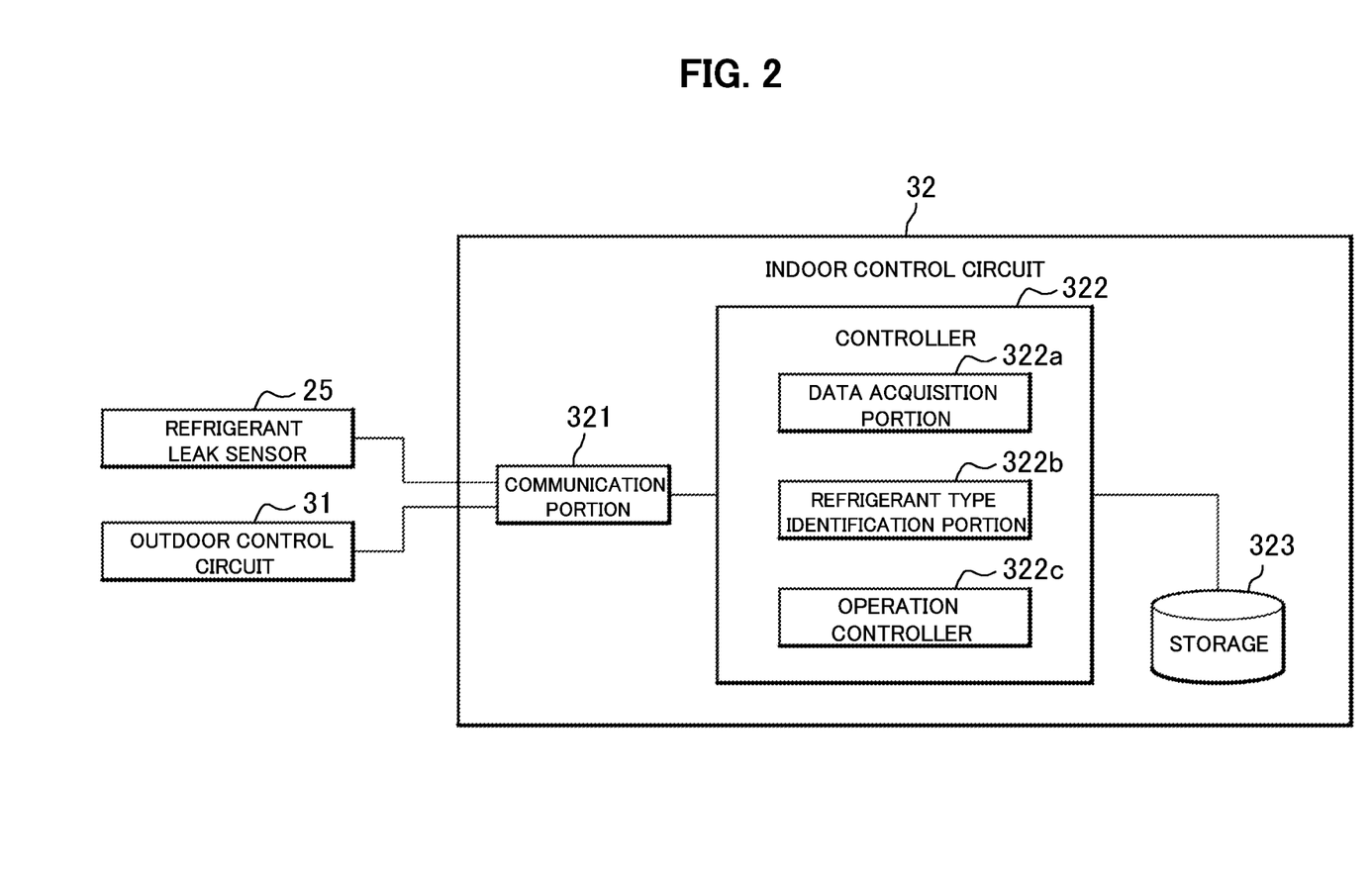
FIG. 2 is a functional block diagram including an indoor control circuit of the air-conditioner according to the first embodiment of the present invention.

FIG. 2 is a functional block diagram including the indoor control circuit 32 of the air-conditioner 100.

As depicted in FIG. 2, the indoor control circuit 32 is provided with a communication portion 321, a controller 322, and a storage 323.

The communication portion 321 provides an interface for acquiring signals from the refrigerant leak sensor 25 and exchanging predetermined data with the outdoor control circuit 31.

The controller 322 has the function of controlling the indoor fan Fi and the like based on whether the refrigerant sealed in the refrigerant circuit 10 is flammable. As depicted in FIG. 2, the controller 322 is provided with a data acquisition portion 322a, a refrigerant type identification portion 322b, and an operation controller 322c.

The data acquisition portion 322a acquires, via the communication portion 321, predetermined data from the refrigerant leak sensor 25 and the outdoor control circuit 31, for example. The data acquired by the data acquisition portion 322a are stored in the storage 323.

The refrigerant type identification portion 322b identifies the type of the refrigerant sealed in the refrigerant circuit 10 based on, for example, the degree of superheat of the refrigerant on the suction side/discharge side of the compressor 11 (see FIG. 1). The process performed by the refrigerant type identification portion 322b will be described later.

The operation controller 322c controls the indoor fan Fi and the like based on a predetermined program.

In the storage 323, the data acquired by the data acquisition portion 322a are temporarily stored. In the storage 323, a target value of discharge superheat degree and refrigerant physical property data (data used for calculating a condensation temperature and an evaporation temperature), which will be described later, are associated with the type of refrigerant (such as refrigerant R410A and refrigerant R32) and stored in advance.

Concerning Physical Property of Refrigerants

In the following, an example will be described in which one of two types of refrigerant R410A and refrigerant R32 is sealed in the refrigerant circuit 10 (see FIG. 1). The refrigerant R410A is an HFC-type mixed refrigerant which is a mixture of refrigerant R32 and refrigerant R125. The refrigerant R410A has the characteristic of having a relatively high vapor pressure, and making it possible to achieve an increase in refrigeration cycle efficiency easily.

On the other hand, the refrigerant R32 is an HFC-type single refrigerant. The refrigerant R32 has the characteristic of having a lower global warming potential (GWP) than refrigerant R410A, and making it possible to contribute to suppression of global warming.

While the refrigerant R32 is flammable (mildly flammable), the refrigerant R410A is nonflammable. In the present embodiment, the difference in refrigerant physical property (flammable/nonflammable) is taken into consideration in implementing a control in case of a refrigerant leak.

The predetermined threshold value (threshold value of the concentration of the refrigerant) as a reference in determining whether a refrigerant leak is sensed by the refrigerant leak sensor 25 may be set to different values depending on the type of refrigerant. For example, when the refrigerant sealed in the refrigerant circuit 10 is flammable, the controller 322 sets the predetermined threshold value (threshold value of the concentration of the refrigerant) to a value smaller than when the refrigerant sealed in the refrigerant circuit 10 is nonflammable. In this way, it becomes possible to sense a leak of flammable refrigerant with high sensitivity. In addition, no matter whether the refrigerant R410A or the refrigerant R32 is sealed in the refrigerant circuit 10, it becomes possible to sense a leak of refrigerant appropriately using a single refrigerant leak sensor 25.

<Process of the Controller>

Figure 3:
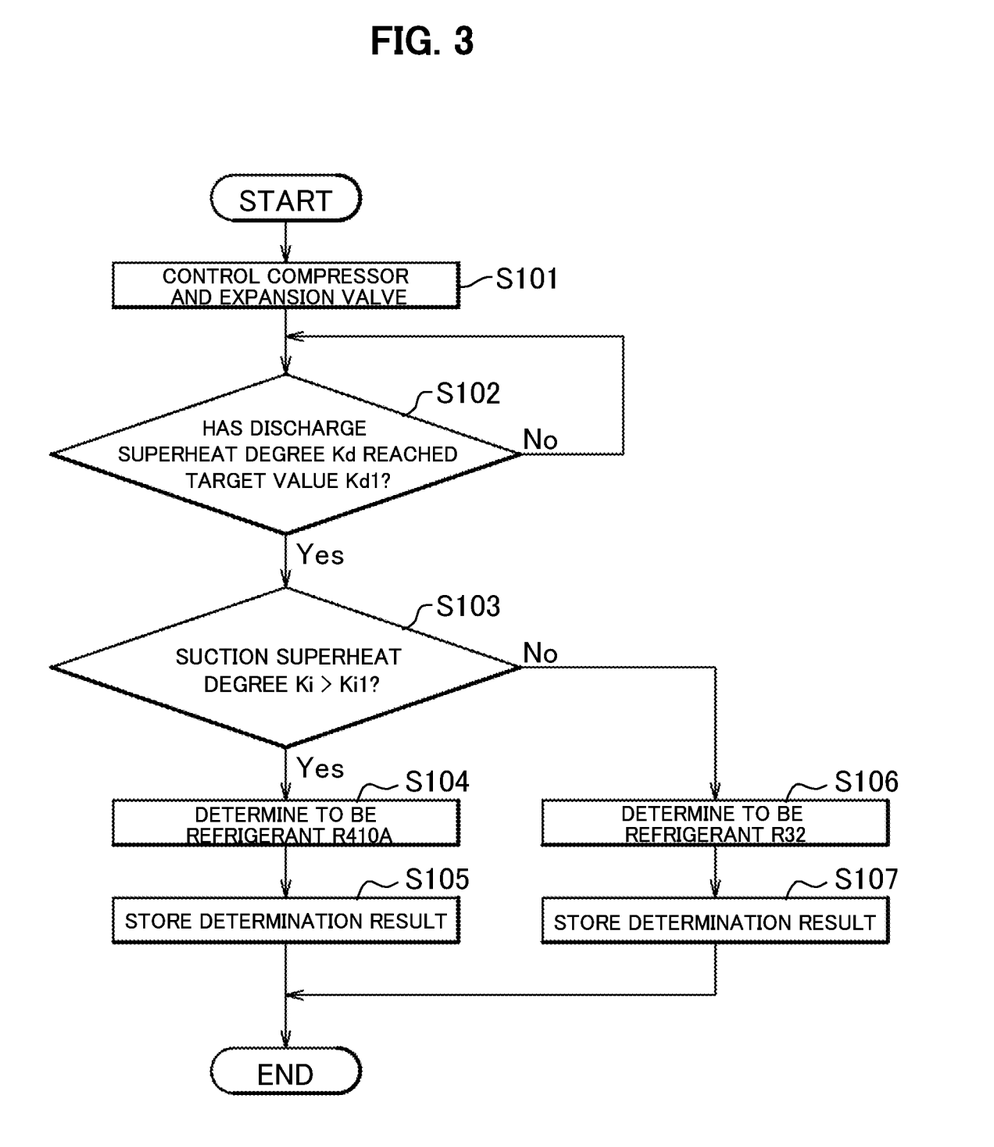
FIG. 3 is a flowchart of a process during a test operation of the air-conditioner according to the first embodiment of the present invention.

FIG. 3 is a flowchart of a process during a test operation of the air-conditioner 100 (see FIG. 1 and FIG. 2, as appropriate).

It is assumed that the test operation of the air-conditioner 100 is started at "START" in FIG. 3. The "test operation" herein refers to an operation that is performed on a trial basis prior to a normal air-conditioning operation after the air-conditioner 100 has been installed. It is assumed that in the refrigerant circuit 10 of the air-conditioner 100, the refrigerant R410A or the refrigerant R32 is sealed (either one of the refrigerants may be sealed).

In step S101, the controller 322 controls the compressor 11 and the expansion valve 14, as appropriate, using the operation controller 322c. For example, the controller 322, based on a target value Kd1 of the degree of superheat of the refrigerant on the discharge side of the compressor 11, sets control command values for the compressor 11 and the expansion valve 14, and performs a test operation of the air-conditioner 100.

The "degree of superheat" refers to a numerical value that indicates by how many degrees the actual temperature of refrigerant is higher than the saturation temperature of refrigerant with respect to a pressure. The degree of superheat of the refrigerant on the discharge side of the compressor 11 is referred to as a "discharge superheat degree". The degree of superheat of the refrigerant on the suction side of the compressor 11 is referred to as a "suction superheat degree". The target value of the discharge superheat degree Kd1 during a test operation is set in advance based on the physical property of refrigerant R410A or refrigerant R32.

In step S102, the controller 322 determines whether the discharge superheat degree Kd at the current point in time has reached the predetermined target value Kd1. For example, the controller 322 calculates, based on the physical property of refrigerant R410A, a condensation temperature corresponding to a detected value from the discharge pressure sensor 21. Further, the controller 322 subtracts the condensation temperature from a detected value from the discharge temperature sensor 22, thereby calculating the discharge superheat degree Kd of refrigerant at the current point in time. That is, the controller 322 calculates the discharge superheat degree Kd when it is assumed in this case that refrigerant R410A is sealed in the refrigerant circuit 10. The controller 322 then determines whether the discharge superheat degree Kd at the current point in time has reached the predetermined target value Kd1 (the target value Kd1 corresponding to refrigerant R410A).

In step S102, if the discharge superheat degree Kd has reached the target value Kd1 (S102: Yes), the process of the controller 322 proceeds to step S103. On the other hand, if the discharge superheat degree Kd has not reached the target value Kd1 (S102: No), the controller 322 repeats the process of step S102.

In step S103, the controller 322 determines whether a suction superheat degree Kd is higher than a predetermined threshold value Ki1, using the refrigerant type identification portion 322b. The predetermined threshold value Ki1 is a threshold value of a suction superheat degree as a reference for determining the type of refrigerant, and is set in advance. For example, the controller 322, based on the physical property of refrigerant R410A, determines an evaporation temperature corresponding to a detected value from the suction pressure sensor 23. Further, the controller 322 subtracts the evaporation temperature from a detected value from the suction temperature sensor 24, thereby calculating the suction superheat degree Ki of refrigerant at the current point in time. The controller 322 then compares the magnitudes of the suction superheat degree Ki and the predetermined threshold value Ki1.

In step S103, if the suction superheat degree Ki is higher than the predetermined threshold value Ki1 (S103: Yes), the process of the controller 322 proceeds to step S104.

In step S104, the controller 322 determines that the refrigerant sealed in the refrigerant circuit 10 is refrigerant R410A. This is because refrigerant R410A is more likely to become a superheated vapor than refrigerant R32 is. Thus, the controller 322 identifies the type of the refrigerant sealed in the refrigerant circuit 10 based on the degree of superheat of the refrigerant on the suction side/discharge side of the compressor 11.

In step S105, the controller 322 stores the result of determination in step S104. That is, the controller 322 stores in the storage 323 information that the refrigerant actually sealed in the refrigerant circuit 10 is refrigerant R410A.

On the other hand, if in step S103 the suction superheat degree Ki is smaller than or equal to the predetermined threshold value Ki1 (S103: No), the process of the controller 322 proceeds to step S106.

In step S106, the controller 322 determines that the refrigerant sealed in the refrigerant circuit 10 is refrigerant R32. This is because refrigerant R32 is less likely to become a superheated vapor (more likely to remain in a gas-liquid two-phase state) than refrigerant R410A.

In step S107, the controller 322 stores the result of the determination of step S106. That is, the controller 322 stores in the storage 323 information that the refrigerant actually sealed in the refrigerant circuit 10 is refrigerant R32.

Prior to the test operation, it is not clear on the controller 322 side which of refrigerant R410A and refrigerant R32 is sealed in the refrigerant circuit 10. Accordingly, when refrigerant R32 is actually sealed in the refrigerant circuit 10, for example, there is the possibility that the physical property of refrigerant R410A information might be used when calculating the discharge superheat degree Kd in step S102 and the suction superheat degree Ki in step S103.

In order to prevent an erroneous determination in the processes of steps S104 and S106 even in such a case, the target value Kd1 (S102) and the predetermined threshold value Ki1 (S103) are set appropriately. After the process of step S105 or step S107 has been performed, the controller 322 ends the process for the test operation (END).

The controller 322 may calculate the discharge superheat degree Kd and the suction superheat degree Ki (S102, S103) based on predetermined physical property information that lies somewhere between those of refrigerant R410A and refrigerant R32. The series of processes depicted in FIG. 3 may be performed by the outdoor control circuit 31 (see FIG. 1).

Figure 4:
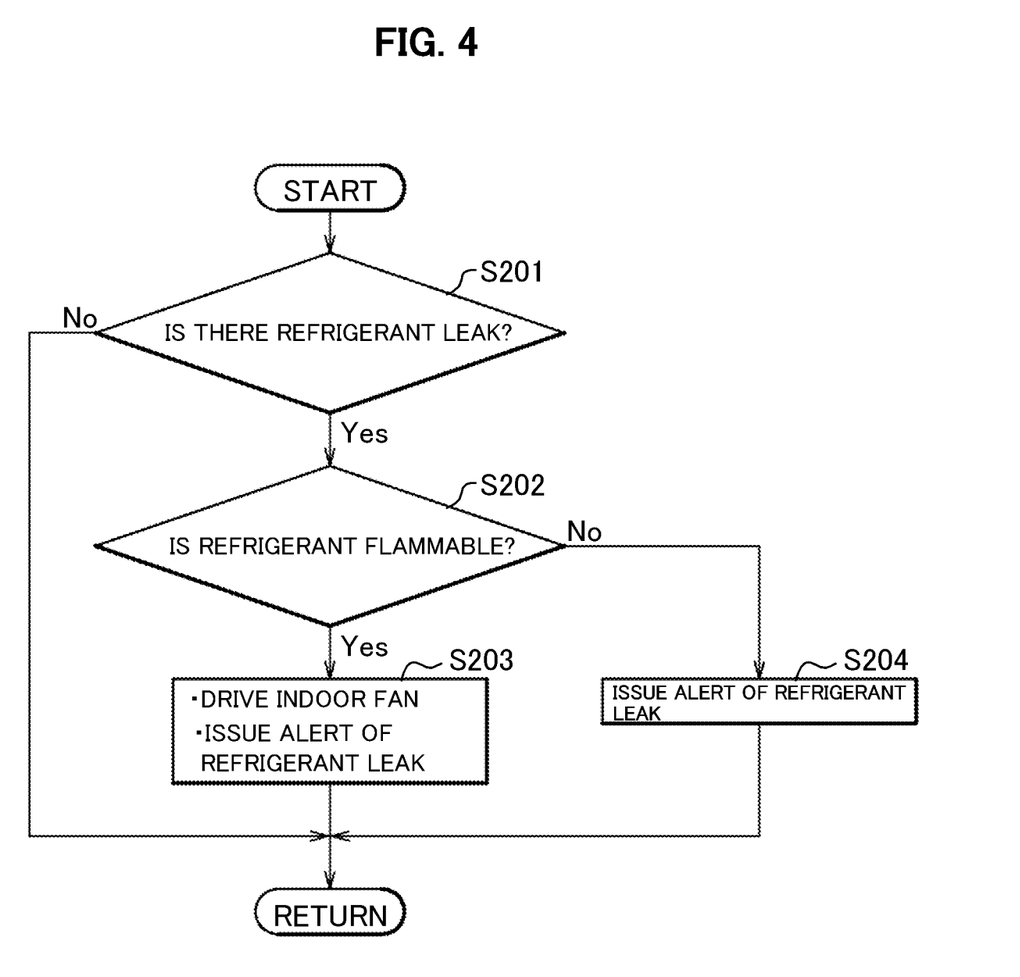
FIG. 4 is a flowchart when an air-conditioning operation of the air-conditioner according to the first embodiment of the present invention is not being performed.

FIG. 4 is a flowchart when an air-conditioning operation of the air-conditioner 100 is not being performed (see FIG. 1 and FIG. 2, as appropriate).

It is assumed that at "START" in FIG. 4, the test operation of the air-conditioner 100 (see FIG. 3) has already been completed. In step S201, the controller 322 determines whether there is a refrigerant leak. That is, the controller 322 determines whether a leak of refrigerant in the refrigerant circuit 10 has been sensed by the refrigerant leak sensor 25.

In step S201, if there is no refrigerant leak (S201: No), the process of the controller 322 returns (RETURN) to "START". On the other hand, if there is a refrigerant leak in step S201 (S201: Yes), the process of the controller 322 proceeds to step S202.

In step S202, the controller 322 determines whether the refrigerant sealed in the refrigerant circuit 10 is flammable. That is, the controller 322, based on the result of processing (S104 or S106 in FIG. 3) during the test operation, determines whether the refrigerant sealed in the refrigerant circuit 10 is flammable.

Data indicating that refrigerant R32 is flammable and refrigerant R410A is nonflammable (data specifying the process of step S203 or S204, as will be described later) are stored in the storage 323 in advance.

In step S202, if the refrigerant sealed in the refrigerant circuit 10 is flammable (S202: Yes), the process of the controller 322 proceeds to step S203. That is, if it is determined that, of refrigerant R410A and refrigerant R32, the flammable refrigerant R32 is sealed in the refrigerant circuit 10, the process of the controller 322 proceeds to step S203.

In step S203, the controller 322 causes the indoor fan Fi to be driven, and further issues an alert of the refrigerant leak. Thus, even when an air-conditioning operation is not being performed, the controller 322 causes the indoor fan Fi to be driven, whereby the flammable refrigerant that has leaked from the refrigerant circuit 10 is dispersed (agitated). That is, it becomes possible, in the space to be air-conditioned, to suppress a localized increase in the concentration of refrigerant and to increase the reliability of the air-conditioner 100. Further, the controller 322 causes the remote controller Re or the like to display the fact that a refrigerant leak has occurred, thus making it possible to alert the user that the refrigerant has leaked from the refrigerant circuit 10. The "alert" of a refrigerant leak may be issued in the form of an audible warning that a refrigerant leak has occurred, for example.

In step S202, if the refrigerant sealed in the refrigerant circuit 10 is not flammable (S202: No), the process of the controller 322 proceeds to step S204. That is, if it is determined that, of refrigerant R410A and refrigerant R32, the nonflammable refrigerant R410A is sealed in the refrigerant circuit 10, the process of the controller 322 proceeds to step S204.

In step S204, the controller 322 issues an alert of the refrigerant leak. That is, when a leak of refrigerant has been sensed by the refrigerant leak sensor 25 (S201: Yes), the controller 322, if the refrigerant sealed in the refrigerant circuit 10 is nonflammable (S202: No), issues an alert of a leak of refrigerant (S204) without causing the indoor fan Fi to be driven.

When the refrigerant that has leaked from the refrigerant circuit 10 is nonflammable (S202: No), no particular problem would be caused if a localized increase in refrigerant concentration has occurred in the space to be air-conditioned. In addition, as the controller 322 does not cause the indoor fan Fi to be driven in the event of a leak of nonflammable refrigerant, the user is hardly made to feel uncomfortable (uncomfortable about the indoor fan Fi being driven despite the absence of an air-conditioning operation). Accordingly, it becomes possible to make the level of comfort and energy-saving performance of the air-conditioner higher than before.

After the process of step S203 or step S204 has been performed, the process of the controller 322 returns (RETURN) to "START". In this way, the controller 322 repeats the series of processes depicted in FIG. 4.

If a leak of refrigerant has been sensed during an air-conditioning operation, gaseous refrigerant dispersed by the driving of the indoor fan Fi, regardless of whether the refrigerant is flammable or not. The control after the air-conditioning operation is later stopped is as described with reference to FIG. 4.

<Effects>

According to the present embodiment, it is possible, based on the degree of superheat of the refrigerant on the suction side/discharge side of the compressor 11, to identify the type of the refrigerant sealed in the refrigerant circuit 10 easily. In the event of a leak of flammable refrigerant (in FIG. 4, S201: Yes, S202: Yes), the controller 322 causes the indoor fan Fi to be driven, and further issues an alert of the refrigerant leak (S203). In this way, it is possible to suppress a localized increase in the concentration of refrigerant in the space to be air-conditioned, and to alert the user about the occurrence of a refrigerant leak.

On the other hand, in the event of a leak of nonflammable refrigerant (in FIG. 4, S201: Yes, S202: No), the controller 322 issues an alert of the refrigerant leak (S204) without causing the indoor fan Fi to be driven. In this way, it is possible to alert the user about the occurrence of a refrigerant leak appropriately, without causing the indoor fan Fi to be driven unnecessarily. Thus, according to the present embodiment, it is possible to provide the air-conditioner 100 which performs an appropriate control in the event of a leak of refrigerant.

In addition, a control in accordance with the type of the refrigerant sealed in the refrigerant circuit 10 is performed by the controller 32. Thus, no matter which of refrigerant R410A and refrigerant R32 is used, the indoor unit Hi of the same model can be commonly used. Accordingly, the manufacturing cost for mass-producing the air-conditioner 100 can be reduced compared to before. Further, when the refrigerant R410A sealed in the refrigerant circuit 10 is replaced with refrigerant R32, for example, it is not necessary to exchange the indoor unit Hi, and the cost on the user side can also be reduced.

Second Embodiment

Figure 5:
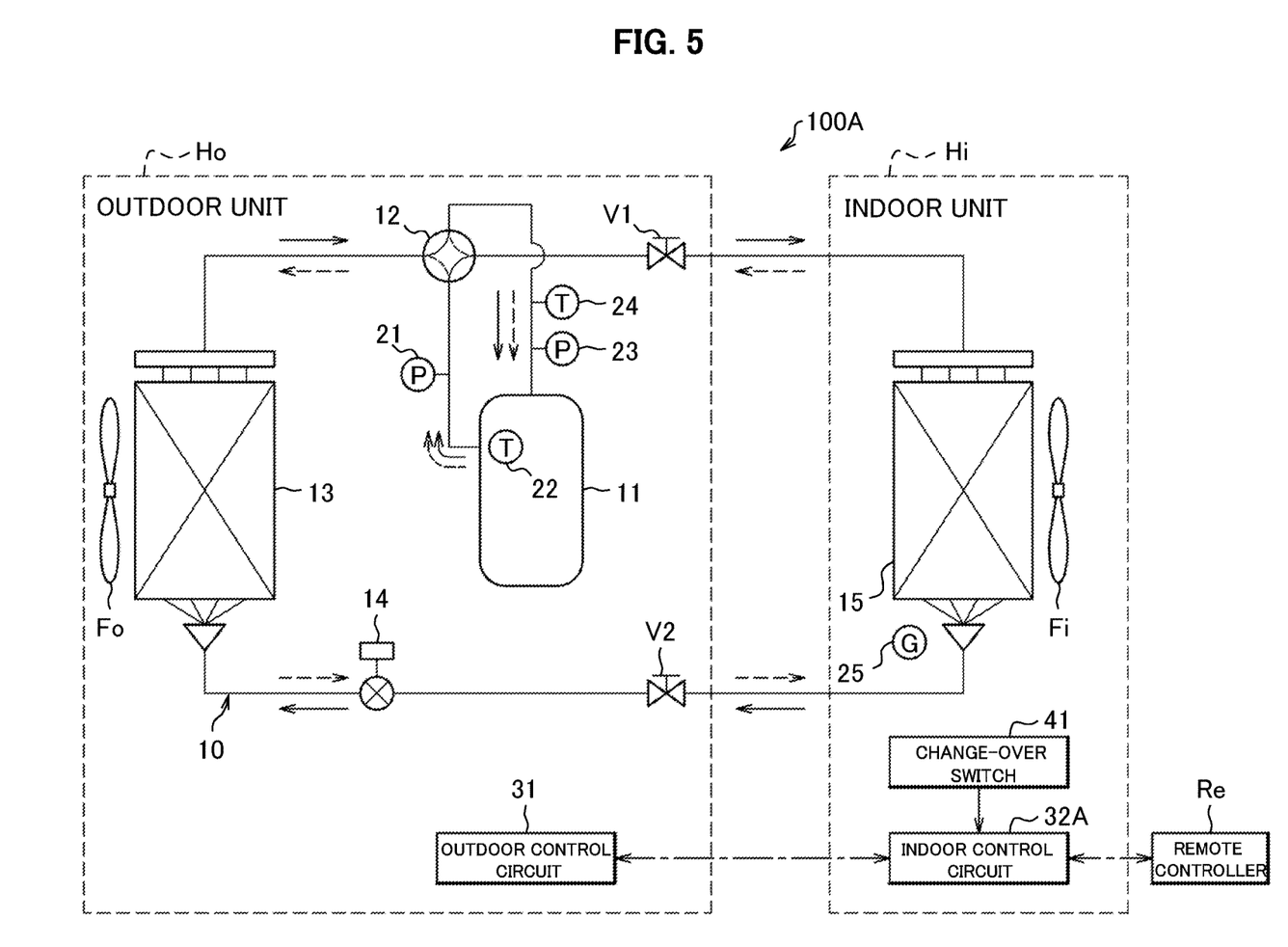
FIG. 5 is a configuration diagram of an air-conditioner according to a second embodiment of the present invention.

A second embodiment differs from the first embodiment in that the type of refrigerant is identified by the operation of a change-over switch 41 (see FIG. 5). The second embodiment is similar in other respects (such as the configuration of the refrigerant circuit 10 and the presumed use of refrigerant R410A or refrigerant R32). Accordingly, the portions different from those of the first embodiment will be described, while description of redundant portions will be omitted.

FIG. 5 is a configuration diagram of an air-conditioner 100A according to the second embodiment.

The air-conditioner 100A depicted in FIG. 5 is provided with the change-over switch 41 (change-over portion), in addition to the configuration (see FIG. 1) described with reference to the first embodiment. The change-over switch 41 is a switch for a change-over operation to be performed by a user (such as a worker during installation) to cause a signal indicating the type of the refrigerant sealed in the refrigerant circuit 10 to be output to an indoor control circuit 32A (controller).

The change-over switch 41 is installed at a predetermined location in the indoor unit Hi, for example, and is changed over by an operation performed by the user. In an example, when refrigerant R410A is sealed in the refrigerant circuit 10, the change-over switch 41 is changed over to on-state by the user, and an on-signal is output from the change-over switch 41 to the indoor control circuit 32A. When refrigerant R32 is sealed in the refrigerant circuit 10, the change-over switch 41 is changed over to off-state by the user, and an off-signal is output from the change-over switch 41 to the indoor control circuit 32A.

The indoor control circuit 32A, based on the signal input from the change-over switch 41, controls the indoor fan Fi. The process of the indoor control circuit 32A will be described with reference to FIG. 6.

Figure 6:
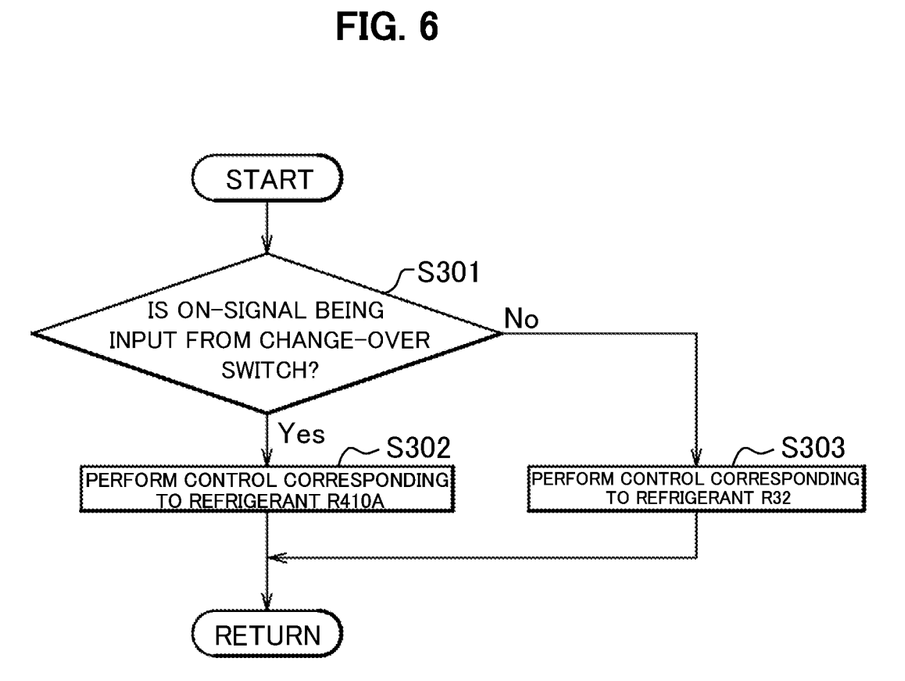
FIG. 6 is a flowchart of a process performed by a controller of the air-conditioner according to the second embodiment of the present invention.

FIG. 6 is a flowchart of the process performed by the indoor control circuit 32A.

The process of FIG. 6 is performed after the test operation of the air-conditioner 100 has been completed. During the test operation, the user (worker) operates the change-over switch 41 appropriately based on the type of refrigerant actually sealed in the refrigerant circuit 10.

In step S301, the indoor control circuit 32A determines whether an on-signal is being input from the change-over switch 41. If an on-signal is being input from the change-over switch 41 (S301: Yes), the process of the indoor control circuit 32A proceeds to step S302.

In step S302, the indoor control circuit 32A, based on the on-signal input from the change-over switch 41, performs a control corresponding to the nonflammable refrigerant R410A. For example, if a leak of refrigerant has been sensed by the refrigerant leak sensor 25 during stoppage of an air-conditioning operation, the indoor control circuit 32A issues an alert of a leak of refrigerant without causing the indoor fan Fi to be driven.

On the other hand, in step S301, if an off-signal is being input from the change-over switch 41 (S301: No), the process of the indoor control circuit 32A proceeds to step S303.

In step S303, the indoor control circuit 32A, based on the off-signal input from the change-over switch 41, performs a control corresponding to the flammable refrigerant R32. For example, if a leak of refrigerant has been sensed by the refrigerant leak sensor 25 during stoppage of an air-conditioning operation, the indoor control circuit 32A causes the indoor fan Fi to be driven, and further issues an alert of a leak of refrigerant.

After the process of step S302 or step S303 has been performed, the process of the indoor control circuit 32A returns (RETURN) to "START". In this way, the indoor control circuit 32A repeats the series of processes depicted in FIG. 6.

A predetermined threshold value (threshold value of the concentration of refrigerant) as a reference in determining whether a leak of refrigerant is sensed by the refrigerant leak sensor 25 may be set by the indoor control circuit 32A as follows. That is, the indoor control circuit 32A sets the predetermined threshold value (threshold value of the concentration of refrigerant) when the refrigerant sealed in the refrigerant circuit 10 is flammable to a value smaller than when the refrigerant is nonflammable. In this way, it is possible to sense a leak of flammable refrigerant with high sensitivity, for example.

<Effects>

According to the present embodiment, based on the signal input from the change-over switch 41, it is possible for the indoor control circuit 32A to perform a control suitable for the type of the refrigerant sealed in the refrigerant circuit 10 (refrigerant R410A or refrigerant R32).

<<Modification>>

While the air-conditioners 100, 100A according to the present invention have been described with reference to the embodiments, the present invention is not limited to the foregoing descriptions and may include various changes.

For example, the first embodiment has been described with reference to the process (see FIG. 3) in which, based on the degree of superheat on the discharge side/suction side of the compressor 11, the controller 322 identifies the type of the refrigerant sealed in the refrigerant circuit 10. However, this is not a limitation. That is, the type of the refrigerant sealed in the refrigerant circuit 10 may be identified using other well-known methods based on the physical property and the like of the refrigerant.

The first embodiment has been described with reference to the configuration in which the controller 322 (see FIG. 2) identifies the type of refrigerant. The second embodiment has been described with reference to the configuration in which the change-over switch 41 (see FIG. 5) outputs a sg indicating the type of refrigerant. However, these are not limitations. For example, when the outdoor unit Ho and the indoor unit Hi have been electrically connected, the outdoor control circuit 31 may transmit data indicating the form of the outdoor unit Ho to the indoor control circuit 32. This is because the type of the refrigerant sealed in the refrigerant circuit 10 is often uniquely identified by the form of the outdoor unit Ho. Then, the indoor control circuit 32 performs a control in the event of a refrigerant leak appropriately, based on the data (corresponding to the type of refrigerant) indicating the type of the outdoor unit Ho.

The embodiments have been described with reference to the case in which one of refrigerant R410A and refrigerant R32 is used in the air-conditioner 100. However, this is not a limitation. For example, a manager may select any two types of refrigerant from various refrigerants, such as HFC-type refrigerants, HCFC-type refrigerants, and natural refrigerants.

The HFC-type refrigerants may include, in addition to refrigerant R410A and refrigerant R32, refrigerant R125, refrigerant R134a, refrigerant R152a, refrigerant R404A, and refrigerant R407C. The HCFC-type refrigerants may include refrigerant R22, refrigerant R123, refrigerant R141b, refrigerant R142b, and refrigerant R225. The natural refrigerant may include carbon dioxide, hydrocarbon, and water.

The first embodiment has been described with reference to the process (S204) in which, if a leak of nonflammable refrigerant has been sensed (in FIG. 4, S201: Yes, S202: No), the controller 322 issues an alert of a leak of refrigerant. However, this is not a limitation. For example, if a leak of nonflammable refrigerant has been sensed, the controller 322 may neither drive the indoor fan Fi nor issue an alert of the leak of refrigerant. If a leak of flammable refrigerant has been sensed, the controller 322 may cause the indoor fan Fi to be driven without issuing an alert of the leak of refrigerant.

The controller 322 may identify the refrigerant sealed in the refrigerant circuit 10 from among three or more types of refrigerant, and perform a control corresponding to the identified type of refrigerant. The controller 322, based on information from the change-over switch 41, may identify the refrigerant sealed in the refrigerant circuit 10 from among three or more types of refrigerant, and perform a control corresponding to the identified type of refrigerant.

The first embodiment has been described with reference to the process in which the controller 322 determines the type of the refrigerant sealed in the refrigerant circuit 10 during a test operation. However, this is not a limitation. For example, the controller 322 may determine the type of the refrigerant sealed in the refrigerant circuit 10 during a normal air-conditioning operation.

The embodiments have been described with reference to the configuration in which the air-conditioner 100 (see FIG. 1) is provided with a single indoor unit Hi. However, this is not a limitation. That is, the embodiments may be applied to a multi-type air-conditioner provided with a plurality of indoor units. The embodiments may also be applied to an integrated-type air-conditioner in which an indoor unit and an outdoor unit are integrated.

The embodiments have been described in detail to facilitate an understanding of the present invention, and are not necessarily limited to those provided with all of the configurations described. With respect to part of the configuration of each embodiment, addition, deletion, or substitution of other configurations is possible.

In addition, the mechanisms and configurations described above are those considered necessary for illustration purpose, and do not necessarily indicate all of the mechanisms or configurations required in a product.

DESCRIPTION OF REFERENCE SIGNS 100, 100A Air-conditioner
10 Refrigerant circuit
11 Compressor
12 Four-way valve
13 Outdoor heat exchanger (condenser/evaporator)
14 Expansion valve
15 Indoor heat exchanger (evaporator/condenser)
21 Discharge pressure sensor
22 Discharge temperature sensor
23 Suction pressure sensor
24 Suction temperature sensor
25 Refrigerant leak sensor
31 Outdoor control circuit (controller)
32, 32A Indoor control circuit (controller)
41 Change-over switch (change-over portion)
321 Communication portion
322 Controller
323 Storage
Fi Indoor fan
Fo Outdoor fan
Ho Outdoor unit
Hi Indoor unit

The invention claimed is:

1. An air-conditioner comprising:
a refrigerant circuit through which a refrigerant is configured to circulate in a refrigeration cycle via a compressor, a condenser, an expansion valve, and an evaporator successively, wherein the condenser or the evaporator is an indoor heat exchanger;
a refrigerant leak sensor configured to sense a leak of the refrigerant in the refrigerant circuit;
an indoor fan configured to deliver air to the indoor heat exchanger;
a controller configured to, upon receipt of a signal from the refrigerant leak sensor indicating a leak has been sensed, control the indoor fan based on whether a refrigerant sealed in the refrigerant circuit is flammable; and
a change-over portion including a switch, the change-over portion configured to, upon switching of the switch, output a signal indicating the type of the refrigerant sealed in the refrigerant circuit to the controller,
wherein the controller is further configured to, upon receipt of the signal from the refrigerant leak sensor indicating the leak has been sensed, control the indoor fan based on the signal from the change-over portion.

2. The air-conditioner according to claim 1, wherein the controller is configured to, upon receipt of a signal from the refrigerant leak sensor indicating a leak has been sensed, cause the indoor fan to be driven when the refrigerant sealed in the refrigerant circuit is flammable.

3. The air-conditioner according to claim 2, wherein the controller is configured to, upon receipt of a signal from the refrigerant leak sensor indicating a leak has been sensed, cause the indoor fan to be driven and further issues an alert of a leak of the refrigerant when the refrigerant sealed in the refrigerant circuit is flammable.

4. The air-conditioner according to claim 1, wherein the controller is configured to, upon receipt of a signal from the refrigerant leak sensor indicating a leak has been sensed, does not cause the indoor fan to be driven when the refrigerant sealed in the refrigerant circuit is nonflammable.

5. The air-conditioner according to claim 4, wherein the controller is configured to, upon receipt of a signal from the refrigerant leak sensor indicating a leak has been sensed, issue an alert of a leak of the refrigerant without causing the indoor fan to be driven when the refrigerant sealed in the refrigerant circuit is nonflammable.

6. The air-conditioner according to claim 1, wherein the controller is configured to identify a type of the refrigerant sealed in the refrigerant circuit based on a degree of superheat of the refrigerant on a suction side/discharge side of the compressor, and control the indoor fan based on whether the identified refrigerant of the type is flammable.

7. The air-conditioner according to claim 6,
wherein the refrigerant leak sensor is configured to sense a leak of the refrigerant when a concentration of the refrigerant detected by the refrigerant leak sensor is greater than or equal to a predetermined threshold value, and
wherein the controller is configured to set the predetermined threshold value when the refrigerant sealed in the refrigerant circuit is flammable to a value smaller than when the refrigerant sealed in the refrigerant circuit is nonflammable.

8. The air-conditioner according to claim 1,
wherein the refrigerant leak sensor is configured to sense a leak of the refrigerant when a concentration of the refrigerant detected by the refrigerant leak sensor is greater than or equal to a predetermined threshold value, and wherein the controller is configured to set the predetermined threshold value when the refrigerant sealed in the refrigerant circuit is flammable to a value smaller than when the refrigerant sealed in the refrigerant circuit is nonflammable.

\* \* \* \* \*